3,775,466
ISOBORNYLOXYCARBONYLAMINO ACIDS
Georg Jager, Raunheim am Main, and Rolf Geiger, Frankfurt am Main, Germany (both % Farbwerke Hoechst A.G., Frankfurt am Main, Germany)
No Drawing. Filed Mar. 17, 1971, Ser. No. 125,426
Claims priority, application Germany, Mar. 19, 1970, P 20 13 033.0; Feb. 4, 1971, P 21 05 150.3
Int. Cl. C07c 133/10, 125/04
U.S. Cl. 260—482 B         4 Claims

ABSTRACT OF THE DISCLOSURE

Isobornyloxycarbonylamino acids and derivatives thereof, particularly $N^\alpha$-benzyloxycarbonyl-$N^G,N^G$-bis - (isobornyloxycarbonyl)arginine, $N^G,N^G$ - bis-(isobornyloxycarbonyl)-arginine, and $N^\alpha,N^G,N^G$-tris-(isobornyloxycarbonyl)-arginine, useful as intermediates in the synthesis of peptides, prepared by reacting an amino acid or derivatives thereof either with isobornyloxycarbonyl chloride or with an isobornyloxycarbonyl active ester.

---

The present invention relates to isobornyloxycarbonylamino acids and derivatives thereof and to a process for the preparation of these compounds comprising reacting an amino acid, the carboxyl group of which is conveniently bound in form of a salt, or derivatives thereof, either with isobornyloxycarbonyl chloride in the presence of an acid-binding agent at a pH value between 6 and 14 or with an isobornyloxycarbonyl active ester.

Surprisingly the isobornyloxycarbonyl protective group (Ibc), which is of the urethane type, may be easily split off with acids, such as trifluoroacetic acid or hydrogen chloride in glacial acetic acid, under mild conditions, although it derives from a secondary alcohol.

The protective groups most frequently used for amino or imino groups of amino acids also are of; the urethane type, but in many cases, especially when these groups derive from a primary or secondary alcohol, such as the carbobenzoxy, p - phenylazocarbobenzoxy, diisopropylmethoxycarbonyl, cyclopentyloxycarbonyl, cyclohexyloxycarbonyl, and 2-methyl-cyclohexyloxycarbonyl group, they can be split off only under more severe conditions with very strong acids, such as hydrogen bromide, with additional heating frequently being necessary [cf. E. Schroeder and K. Luebke, "The Peptides," vol. 1, pages 22–41, Academic Press, New York and London (1965), as well as K. Blaha and J. Rudinger, Collection Czechoslov. Chem. Commun. 30, 599–604 (1965)]. The p-methoxycarbobenzoxy, tert.butyloxycarbonyl, tert.-amyloxycarbonyl and 1-adamantyloxycarbonyl groups may be split off with weaker acids such as trifluoroacetic acid, but their introduction into amino acids is considerably complicated by the fact that chlorides thereof are unstable at room temperature [cf. Experientia 25, 576–578 (1969) and Bull. Chem. Soc. Japan 42, 809–811 (1969)], and one generally depends on the corresponding azides or active esters which are more difficult to prepare. Only the 1-adamantyloxycarbonyl chloride is stable to a certain extent but with a greater number of amino acids it may be reacted only with insufficient yields [cf. J. Am. Chem. Soc. 88, 1988–1992 (1966)]. Furthermore, 1-adamantol, serving as the starting material, is only obtainable with some difficulty. Another disadvantage of the p-methoxycarbobenzoxy group is its instability to catalytic hydrogenation, so that the frequently desired selective separation of the carbobenzoxy group, which may be easily eliminated with catalytically activated hydrogen, is not possible. Moreover, the tertiary butyloxycarbonyl azide employed for introducing the tertiary butyloxycarbonyl group is physiologically dangerous [cf. Chimia 23, 298 (1969)].

The new amino or imino protective group does not have these disadvantages, since it may be introduced with very good yields and isobornyloxycarbonyl chloride is easily obtainable and very stable at room temperature. The group is also stable to catalytic hydrogenation and may be easily split off at room temperature with trifluoroacetic acid or hydrogen chloride. It is also a great advantage to use the isobornyloxycarbonyl group as a guanidino protective group in arginine. Two Ibc radicals are introduced into the guanidino group with a good yield; the group is then blocked and its basicity is suppressed.

The isobornyloxycarbonyl compounds are prepared by reacting amino acids or derivatives thereof which have at least one or more than one free amino or imino groups, or both groups together, with the very stable isobornyloxycarbonyl chloride, which is added before or during acylation. The operation is carried out in the presence of an excess of an acid-binding agent such as alkali metal or alkaline earth hydroxides, carbonates, acetates, amides, alcoholates or tertiary organic amines; by this process the free carboxyl groups present are bound in form of a salt and the hydrochloric acid set free is intercepted. For example sodium hydroxide, potassium hydroxide, lithium hydroxide, barium hydroxide, sodium or potassium alcoholate, carbonate, amide, acetate, tertiary amines such as triethylamine, tripropylamine, tributylamine, N-methylmorpholine, or N-ethylmorpholine are used. The operation is carried out at $-15°$ to $+50°$ C., preferably at $0°$ to $25°$ C., and at a pH value of 6 to 14, preferably at pH 8 to 10. In most cases, the acylation may be realized after the beginning of the reaction for example at pH 10 and at room temperature—can be completed at $0°$ C. to $5°$ C. and pH 7 to 8. In the case of sterically hindered or slightly basic amino acids, the operation is expediently effected at a pH value of from 10 to 12 in order to accelerate the reaction. Racemic or optically active isobornyloxycarbonyl chloride (D- or L-form) can be used; the chlorides may be easily obtained in known manner from D.L-isoborneol or D- and L-isoborneol with phosgene [cf. J. Chem. Soc. (London) 91, 1973–1981 (1907) and J. Chem. Soc. (London) 127, 1478–1479 (1925)].

The new protective group may also be introduced with the aid of a D, L-, D- or L-isobornyloxycarbonyl active ester such as 2,4,5-trichlorophenyl or N-hydroxysuccinimide ester. The necessary isobornyloxycarbonyl active esters may be easily obtained, for example from isobornyloxycarbonyl chloride and the activating component, such as trichlorophenol or N-hydroxysuccinimide.

The introduction of the Ibc protective group with an Ibc-active ester is, in principle, effected in the same way as with the Ibc chloride. In this case, no acid-binding agent is necessary, but because of solubility the presence of a protective group in the molecule of the amino acid to be reacted is convenient; either a usual COOH-protective group (ester) is used or the COOH group is bound in form of a salt (for example with equimolar amounts of tertiary amine) and a side chain group, for example OH or SH, carries one of the usual protective groups.

In the introduction of the protective group, water, dioxan, tetrahydrofurane, ether, dimethylformamide, dimethylacetamide, pyridine and other solvents commonly used in peptide chemistry, in pure form or mixed with one another may be used.

As amino acids capable of being acylated, all α- or ω-amino or imino acids in their L-, D- or racemic-form which are found in naturally occurring or synthetically obtainable peptides may be used, for example neutral amino acids such as glycine, alanine, valine, norvaline, leucine, isoleucine, norleucine, α-aminobutyric acid, isovaline, 1-aminocyclohexane carboxylic acid, phenylalanine, C-phenylglycine, asparagine, glutamine, β-alanine, γ-aminobutyric acid and ε-aminocaproic acid; acidic amino acids such as aspartic acid, glutamic acid and cysteic acid, basic amino acids such as lysine, arginine, ornithine, tryptophane, histidine and α,γ-diaminobutyric acid; hydroxyamino acids such as serine, threonine, tyrosine, γ-hydroxylysine and dihydroxyphenylalanine; sulfur-containing amino acids such as cysteine, cystine, and methionine; halogene-containing amino acids such as β-chloroalanine, p-chlorophenylalanine, iodogorgoic acid and thyroxine; aromatic amino acids; such as p-amino benzoic acid; amino sulfonic acids, as for example p-aminosulfonic acid; and imino acids such as proline, hydroxyproline, acetidin-2-aminocarboxylic acid, N-methylvaline, N-methylleucine and N-methyl-β-alanine.

As amino acid derivatives, there may be mentioned, for example, esters such as lower alkyl-, benzyl or nitrobenzyl esters: the α- and the ω-carboxyl groups may be esterified. Amides and hydroazides are also considered as derivatives.

One or more than one group of the amino acids, into which the isobornyloxycarbonyl protective group is introduced, may already be protected with a group according to the rules commonly accepted in peptide chemistry. If in the amino acid or in derivatives thereof more than one group capable of being acylated is present, for example further $NH_2$ or OH— or SH— groups, more than one isobornyloxycarbonyl group may be introduced if corresponding amounts of isobornyloxycarbonyl chloride or Ibc active esters are employed.

The isobornyloxycarbonyl compounds are isolated according to the methods commonly used in peptide chemistry. In general, when the acylation is complete, the reaction mixture is adjusted to pH 2 to 3 and the product is extracted with ether, acetic ester, chloroform or other solvents. When the isobornyloxycarbonyl compound is precipitated during the process of acidifying, it may be directly filtered.

The products according to the process may be used as intermediates for the preparation of therapeutically valuable compounds, for examples of peptides such as oxytocin, vasopressin, and insulin, the methods commonly used in peptide chemistry being employed, or they serve as intermediates for therapeutical products, for example sulfonamides and antibiotics.

The following examples illustrate the invention. The abbreviations commonly used in peptide chemistry for the different amino acids and protective groups are employed. The isobornyloxycarbonyl group in its racemic form has been termed Ibc, the D-form D-Ibc and the L-form L-Ibc. Further abbreviations are:

Bz=benzyl
OtBu=tertiary butyl ester
Z=benzyloxycarbonyl
Boc=tertiary butyloxy-carbonyl
Z-Mac=β-(N-benzyloxycarbonyl-N-methyl-aminoethyl)-carbamoyl
Osu=N-hydroxy-succinimide ester
OTCP=trichlorophenyl ester
DCHA=dicyclohexylamine

EXAMPLES

Example 1

(a) Isobornyloxycarbonyl chloride

A solution of 28 g. (181.5 mmoles of D,L-, D- or L-isoborneol and 25 cc. of pyridine in 400 cc. of dried benzene was added dropwise, while stirring, at $-5°$ C. to $+5°$ C. to a solution of 100 g. of phosgene in 350 cc. of dried benzene. Stirring was continued for one hour at 20° C. The filter residue was thoroughly washed with benzene and the filtrate was washed twice with ice-cold water, dried over sodium sulfate and evaporated in vacuum. After mixing with some petroleum ether, the oily residue was evaporated once more in vacuum and dried for a short time in high vacuum.

Yield: 39.4 g. of oil (quantitative)
The oil boils at 77°–78° C./0.4–0.45 torr
Ibc-, D-Ibc- and L-Ibc-chloride have identical IR-spectra
Optical rotation values $[\alpha]_D^{20}$ (c.=1 in chloroform):
  D-Ibc-chloride: $-56.6°$ C.
  L-Ibc-chloride: $+54.3°$ C.
$C_{11}H_{17}ClO_2$ (216.7). Calcd.: Cl, 16.36%. Found: Cl, 16.2%.

(b) Isobornyloxycarbonylamino acids 25 moles of amino acid and 6.25 cc. (30 mmoles) of isobornyloxycarbonyl chloride were mixed dropwise while stirring in 5 cc. of water and 5 cc. of dioxan, at 20° to 25° C. with 4 N sodium hydroxide solution, whereby the pH value of the reaction mixture was maintained between 8 and 10, preferably at 10. After the beginning of the acylation, the pH value diminished rapidly with the evolution of heat; the reaction was completed by further dropwise addition of 4 N sodium hydroxide solution, at pH 10 or preferably at a lower pH value (7 to 9), and at a lower temperature (0° to 10° C.) altogether about 12.5 to 13.5 cc. of 4 N sodium hydroxide solution were consumed until a constant pH value was obtained. If an ether-insoluble salt of the corresponding Ibc-amino acid was formed, the excess of isobornyloxycarbonyl chloride was eliminated by washing with ether. After acidifying with diluted citric acid to reach a pH value between 2 and 3, the Ibc-amino acid set free was taken up in acetic ester, the acetic ester solution was washed twice with water, dried over sodium sulfate and evaporated in vacuo. The residue was triturated with petroleum ether. The dicyclohexylamine salts of the corresponding Ibc-amino acids were prepared by dissolution in ether or, if desired, in petroleum ether and by addition of dicyclohexylamine.

The following table lists the Ibc-amino acids prepared according to this standard prescription. Their purity was examined by thin-layer chromatography (silica gel F, Merck; chloroform/methanol 8:3 and butanol/glacial acetic acid/water 3:1:1).

| Compound | Starting product | Yield (percent) | $[\alpha]_D^{20}$ (c=1 in $CHCl_3$), degrees | Melting point, degrees |
|---|---|---|---|---|
| Ibs-Gly—OH | H-Gly—OH | 100 | | 182–183 |
| Ibc-Ala—OH | H-Ala—OH | 100 | −30.3 | 114–117 |
| Ibc-Leu—OH | H-Leu—OH | 100 | −7.8 | |
| Ibc-Phe—OH | H-Phe—OH | 100 | +45.4 | 78–80 |
| Ibc-Gln—OH | H-Gln—OH | 100 | +14.5 | ~83 |
| Ibc-Tyr(Bz)—OH | H-Tyr(Bz)—OH | 95 | +41.7 | |
| Ibc-Ser—OH | H-Ser—OH | 96 | +12.5 | 58–61 |
| Ibc-Cys(Bz)—OH | H-Cys(Bz)—OH | 90 | −3.7 | |
| Ibc-D,L-Try—OH | H-D,L-Try—OH | 92 | | 188–189 |
| Ibc-His(Ibc)—OH | H-His—OH | 100 | +43.3 | 100–105 |
| Ibc-Glu(OtBu)—OH | H-Glu(OtBu)—OH | 99 | +7.0 | |
| Ibc-Pro—OH | H-Pro—OH | 100 | −65.7 | 141–142 |
| Ibc-N-methyl-β-Ala—OH | H-N-methyl-β-Ala—OH | [2] 76 | | [2] 114–116 |
| Ibc-γ-aminobutyric acid | H-γ-aminobutyric acid | 95 | | [3] 110–110.5 |
| Ibc-ε-aminocaproic acid | ε-aminocaproic acid | 98 | | [3] 89 |
| D-Ibc-Val—OH | H-Val—OH | 99 | −32.6 | 134–136 |
| D-Ibc-Gln—OH | H-Gln—OH | 98 | −24.3 | ~66 |
| D-Ibc-Met—OH | H-Met—OH | 95 | −22.6 | |
| D-Ibc-Ser—OH | H-Ser—OH | 95 | −29.3 | 55–60 |
| D-Ibc-Try—OH | H-Try—OH | 92 | −9.1 | 179 |
| Z-Lys(D-Ibc)—OH | Z-Lys—OH | 100 | −10.9 | |
| L-Ibc-Val—OH | H-Val—OH | 100 | +31.4 | |
| L-Ibc-Phe—OH | H-Phe—OH | 100 | +31.3 | ~70 |
| L-Ibc-Try—OH | H-Try—OH | 91 | +41.4 | ~165 |

[1] c=1 in methanol.
[2] Dicyclohexylamine salt.

Example 2: Introduction of the Isobornyloxycarbonyl Protective Group Under More Severe Reaction Conditions 25 mmoles of amino acid and 6.25 cc. (30 mmoles) of isobornyloxycarbonyl chloride in 5 cc. of water and 5 cc. of dioxan were mixed dropwise while stirring with 4 N sodium hydroxide solution until the acylation started, depending on the reaction capacity of the amino acid, between pH 10 and 12.5. By the addition of some milligrams of sodium carbonate or of priorly prepared Ibc-amino acid, initiation of the reaction may be facilitated. The reaction was completed at pH 10 and room temperature by continuous addition of 4 N sodium hydroxide solution. The whole was worked up according to the instruction given in Example 1(b).

The following table lists the Ibc-amino acids prepared according to this method, the purity of which acids was examined by thin-layer chromatography.

15.0 g. (130 mmoles) of N-hydroxy succinimide in 100 cc. of dioxan was mixed dropwise while stirring at 0° C. with 8.2 cc. (100 mmoles) of pyridine in 65 cc. of dioxan. Stirring was continued for five hours and the whole was allowed to stand for 12 hours at room temperature; then it was suction-filtered, washed with a little amount of dioxane, and the filtrate was evaporated in vacuo. The oily residue was crystallized in methanol/water. Yield: 23.78 g. (81%), melting point 95–97° C.

(b) Isobornyloxycarbonyltrichlorophenyl ester (hereinafter "Ibc-OTCP"): The trichlorophenyl ester was obtained from 10.84 g. (50 mmoles) of Ibc-Cl, 9.87 g. (50 mmoles) of 2,4,5-trichlorophenol and 4.1 cc. (50 mmoles) of pyridine in 82 cc. of dioxan altogether, as described under (a). The product was triturated in methanol. Yield: 18.5 g. (98%), melting point: 84–85° C.

| Compound | Starting product | Yield (percent) | $[\alpha]_D^{20}$ (c=1 in $CHCl_3$) | M.P., degrees | Yield DCHA-salt (percent) | M.P. DCHA-salt, degrees |
|---|---|---|---|---|---|---|
| Ibc-β-Ala-OH | H-β-Ala-OH | 100 | | | 90 | 103–105 |
| Ibc-iso-D, L-Val-OH | H-iso-D, L-Val-OH | 84 | | | 70 | 199–200 |
| Ibc-NH–⟨benzene(H)⟩–COOH | H₂N–⟨benzene(H)⟩–COOH | 82 | | 174–177 | | |
| Ibc-Cys-OH \| Ibc-Cys-OH | H-Cys-OH \| H-Cys-OH | 91 | +17.2 | 69–72 | | |
| Ibc-Glu-OH | H-Glu-OH | 96 | +12.3 | 58 | | |
| Ibc-Lys(Boc)-OH | H-Lys(Boc)-OH | 93 | +10.9 | 65–67 | | |
| Ibc-NH–⟨benzene⟩–COOH | H₂N–⟨benzene⟩–COOH | 90 | | 234–234.5 | | |
| Ibc-NH–⟨benzene⟩–SO₃Na·½H₂O | H₂N–⟨benzene⟩–SO₃H | 80 | | >320 | | |
| D-Ibc-β-Ala-OH | H-β-Ala-OH | 99 | *−26.7 | | 88 | 123.5–124 |

*Optical rotation for DCHA-salt.

Example 3: Introduction of the Ibc Protective Group Into Amino Acid Derivatives by Means of Ibc Active Esters (Isobornyloxycarbonyl)-cysteine - [β - (N-benzyloxycarbonyl - N - methyl - aminoethyl) - carbamoyl]-OH [hereinafter "Ibc-Cys-(Z-Mac)-OH"]

(a) Isobornyloxycarbonyl - N - hydroxy succinimide ester (hereinafter "Ibc-OSu"): A solution of 21.67 g. (100 mmoles) of D,L-isobornyloxycarbonyl chloride and (c) Isobornyloxycarbonylcysteine - [β - (N - benzyloxycarbonyl - N - methyl-aminoethyl)-carbamoyl]-OH dicyclohexylamine [hereinafter "Ibc-Cys-(Z-Mac)-OH DCHA"]:

(α) A suspension of 3.56 g. (10 mmoles) of H-Cys(Z-Mac)-OH (see U.S. patent application Ser. No. 835,259) and 3.25 g. (11 mmoles) of Ibc-OSu in 45 cc. of dimethylformamide was mixed at 0° C. with 1.4 cc. (10 mmoles) of triethylamine. After stirring for 48 hours at room temperature, the resulting solution was evaporated in high vacuum. The oil residue was triturated with diluted citric acid, the aqueous solution was decanted and the oil was dried over $P_2O_5$ in high vacuum, after washing with water. Then it was dissolved in a little amount of chloroform/methanol (8:3) and fed into a column filled with silica gel (0.05–0.2 mm., Merck). The whole was washed out with chloroform/methanol (8:3) in fractions of 5 cc. each. Fractions 22 to 44 were combined and evaporated in vacuum. The residue was triturated in petroleum ether, then dried over $P_2O_5$ in high vacuum and triturated in petroleum ether with dicyclohexylamine. Yield: 6.35 g. (89%). $[\alpha]_D^{22}$: +8.0° C. (c.=1 in chloroform).

(β) 4.16 g. (11 mmoles) of Ibc-OTCP and 3.56 g. (10 mmoles) of H-Cys(Z-Mac)-OH were reacted in 45 cc. of dimethylformamide in the presence of 1.4 cc. of triethylamine, as described under (a), including column separation over silica gel. Yield: 5.3 g. (99%).

The product was identical with the product obtained under (a) by thin-layer chromatography ($R_f$=0.57 in chloroform/methanol (8:3), silica gel F, Merck).

Example 4

Ibc-D-p-chlorophenylalanine-isopropylester 6.96 g. (25 mmoles) of D-p-chlorophenylalanine-isopropyl-ester-hydrochloride and 6.25 cc. (30 mmoles) of Ibc-Cl in 10 cc. of dioxan and 10 cc. of water were mixed dropwise at room temperature at a maximum pH value of 10.0 with altogether 12.8 cc. of 4 N sodium hydroxide solution. After neutralizing with citric acid, the product was introduced into ethyl acetate. The ethyl acetate solution was washed with water, dried over sodium sulfate adn evaporated in vacuum. Yield: 10.55 g. (quantitative). $[\alpha_6D^{22}]$: −34.0° C. (c.=1 in. chloroform).

Example 5

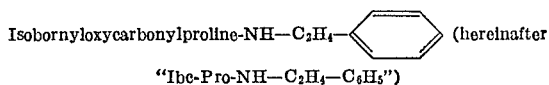 (hereinafter "Ibc-Pro-NH—$C_2H_4$—$C_6H_5$")

The solution of 1.62 g. (5.5 mmoles) of Ibc-OSu and 1.27 g. (5.0 mmoles) of H-Pro-NH-$C_2H_4$-$C_6H_5$. HCl in 10 cc. of dimethylformamide was mixed at 10° C. with 0.69 cc. (5 mmoles) of triethylamine and stirred for 5 hours at room temperature. After evaporating the resulting suspension in high vacuum, the solid residue was triturated in ether and filtered from the undissolved triethylamine-hydrochloride. The filtrate was mixed with petroleum ether. The precipitated crystals were suction-filtered and dried over $P_2O_5$ in high vacuum. Yield: 1.75 g. (88%), melting point 134–136° C. $[\alpha]_D^{22}$: −51.3° C. (c.=1 in $CHCl_3$).

Example 6

(Benzyloxycarbony) - arginine - bis-(isobornyloxycarbonyl)-OH[hereinafter Z-Arg-(Ibc)$_2$-OH]

A suspension of 30.83 g. (100 mmoles) of Z-Arg-OH in 40 cc. of dioxan and 20 cc. of water was first mixed with 50 cc. (240 mmoles) of isobornyloxycarbonyl chloride and then mixed while stirring at 0° C.–5° C. and at a pH value of 11–13 with, altogether,100 cc. of N NaOH. After adding further 10 cc. of isobornyloxycarbonyl chloride, stirring was continued for 3 hours at 0° C. Then the whole was washed 5 times with petroleum ether and taken up into ether. The separated ether phase was agitated with aqueous citric acid solution, washed with water, dried over sodium sulfate and evaporated in vacuum. Gross yield: 67 g. (quantitative). The raw product may be purified by column chromatography on silica gel (0.05–02. mm., F., Merck), the eluant being diethyl or diisopropyl ether. Yield: 44.0 g. (66%). Decomposition at about 124° C. $[\alpha]_D^{22}$: +10.8° (c.=1, in chloroform).

$C_{36}H_{52}N_4O_8$ (668.85). Calcd. (percent): C, 64.7; H, 7.8; N, 8.4. Found (percent): C, 64.9; H, 8.0; N, 8.2.

We claim:

1. An isobornyloxycarbonyl-protected arginine compound selected from the group consisting of $N^\alpha$-benzyloxycarbonyl-$N^G$,$N^G$-bis-(isobornyloxycarbonyl)-arginine; $N^G$,$N^G$-bis-(isobornyloxycarbonyl)-arginine; and $N^\alpha$,$N^G$,$N^G$-tris-(isobornyloxycarbonyl)-arginine.

2. $N^\alpha$-benzyloxycarbonyl-$N^G$,$N^G$-bis-(isobornyloxycarbonyl)-arginine.

3. $N^G$,$N^G$-bis-(isobornyloxycarbonyl)-arginine.

4. $N^\alpha$,$N^G$,$N^G$-tris-(isobornyloxycarbonyl)-arginine.

References Cited

Y. Wolman, Protection of the Amino Group, the Chemistry of the Amino Group, ed. F. Saul Patai, Interscience (1968).

LORRAINE A. WEINBERGER, Primary Examiner

P. J. KILLOS, Assistant Examiner

U.S. Cl. X.R.

260—112.5, 309, 326.14 T, 326.3, 463, 468 E, 470, 471 C, 476 C, 481 C, 482 C

UNITED STATES PATENT OFFICE
CERTIFICATE OF CORRECTION

Patent No. 3,775,466    Dated November 27, 1973

Inventor(s) Jager et al.

It is certified that error appears in the above-identified patent and that said Letters Patent are hereby corrected as shown below:

In the Heading:

After "Main, Germany)" insert

--, assignors to Farbwerke Hoechst Aktiengesellschaft vormals Meister Lucius & Bruning of Frankfurt (Main), Germany.--

Signed and sealed this 4th day of June 1974.

(SEAL)
Attest:

EDWARD M. FLETCHER, JR.
Attesting Officer

C. MARSHALL DANN
Commissioner of Patents